May 13, 1952  A. W. FAHRENKROG  2,596,668
HAY HANDLING APPARATUS
Filed Aug. 25, 1947  4 Sheets-Sheet 1

INVENTOR
Albert W. Fahrenkrog
BY
Thiess, Olson + Mecklenburger
Attorneys

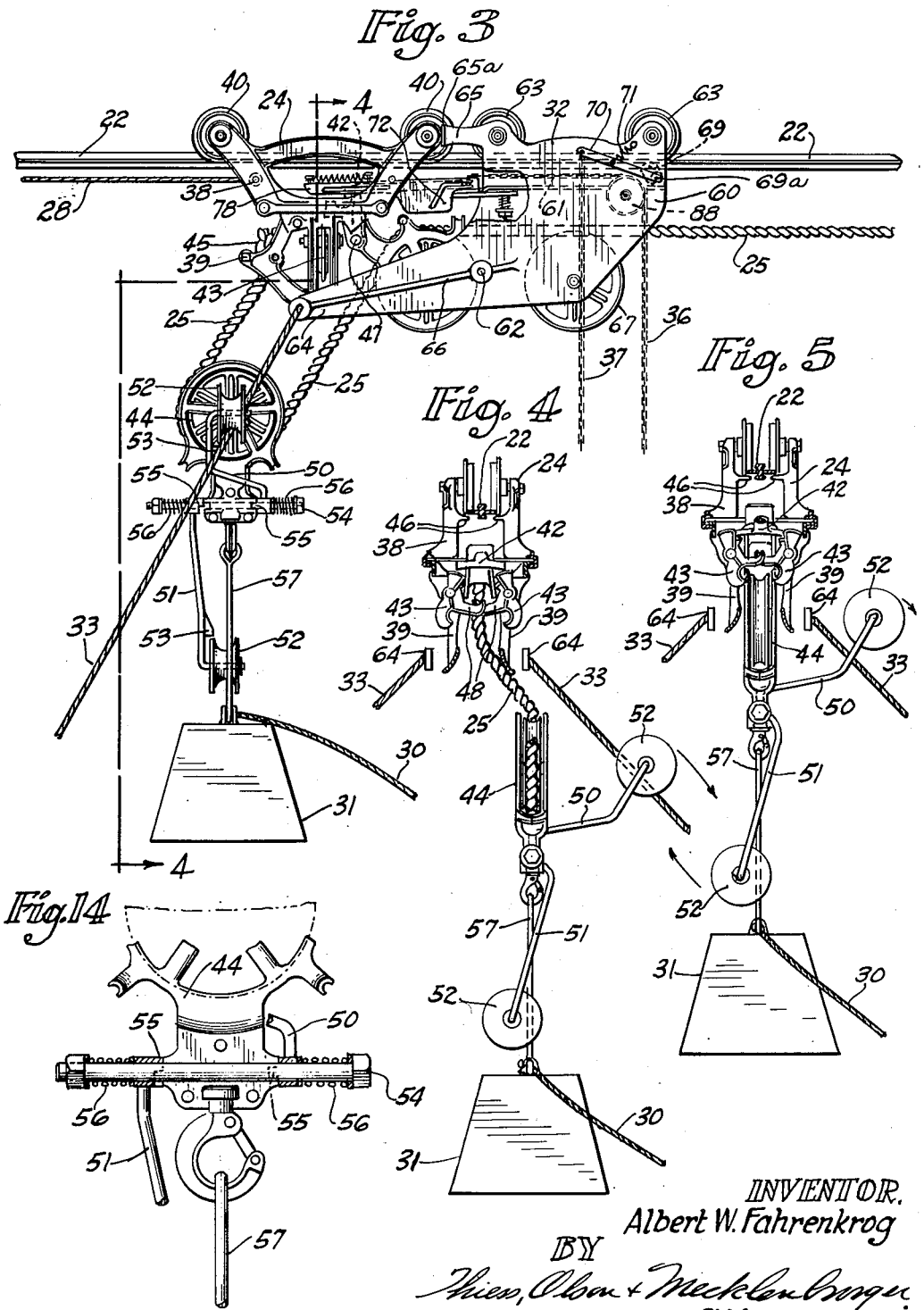

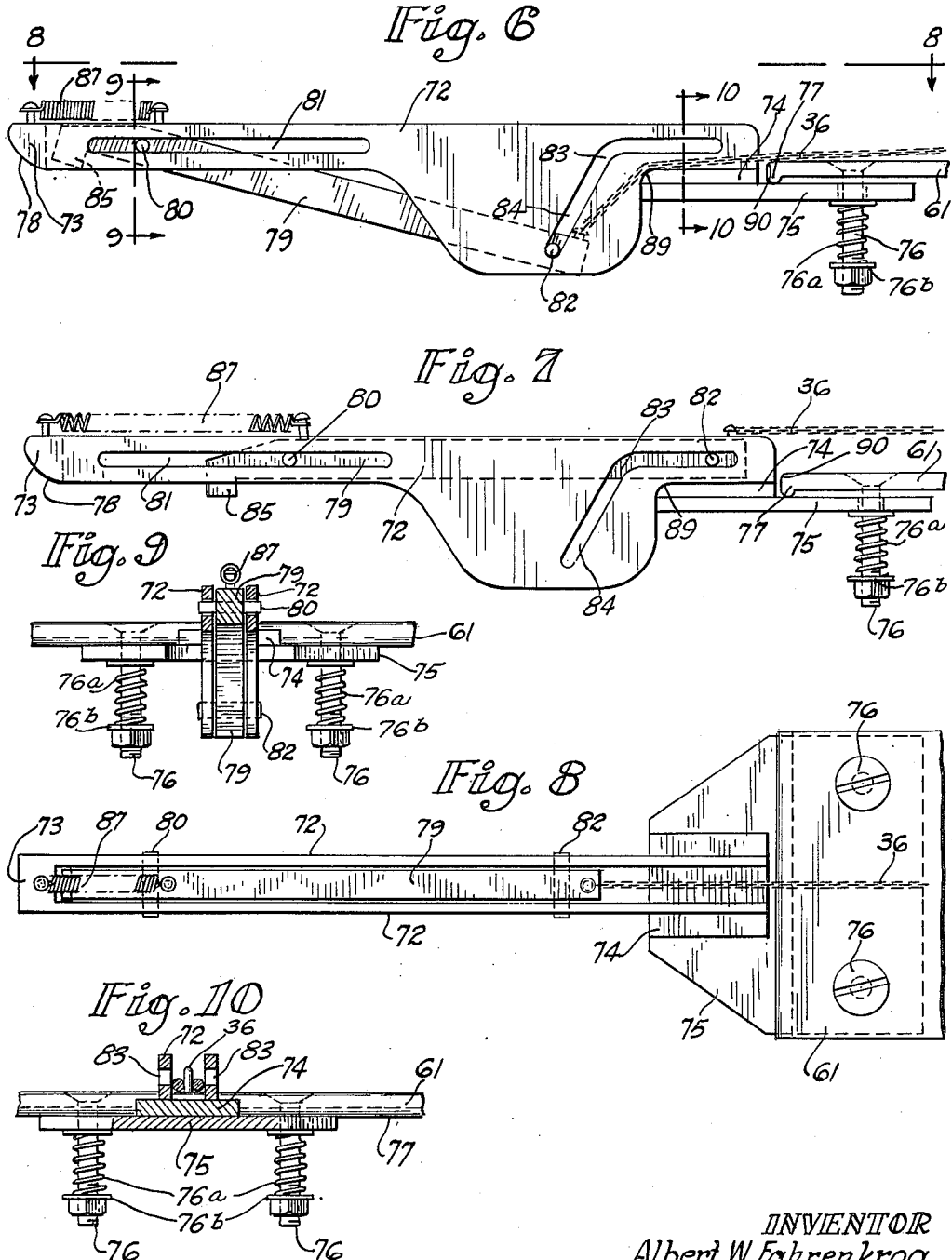

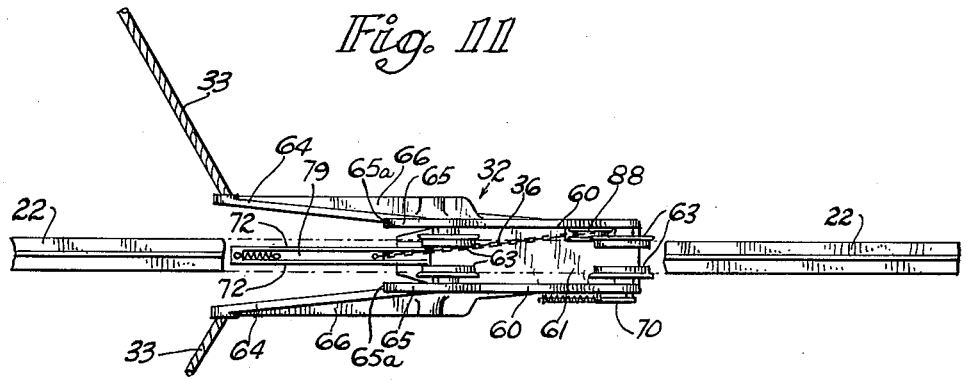
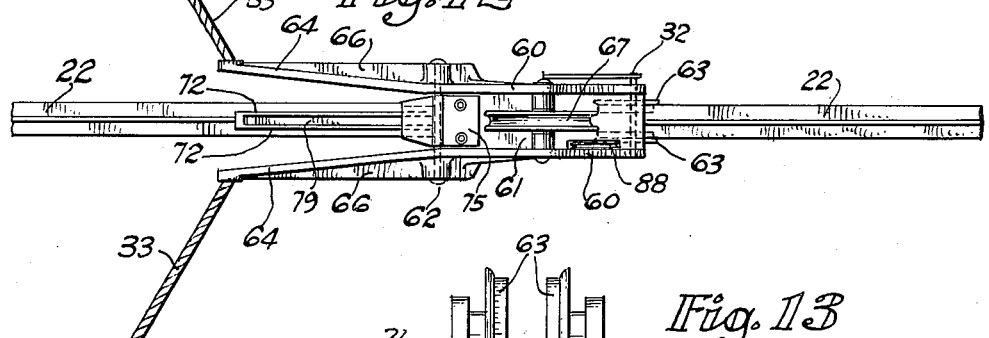
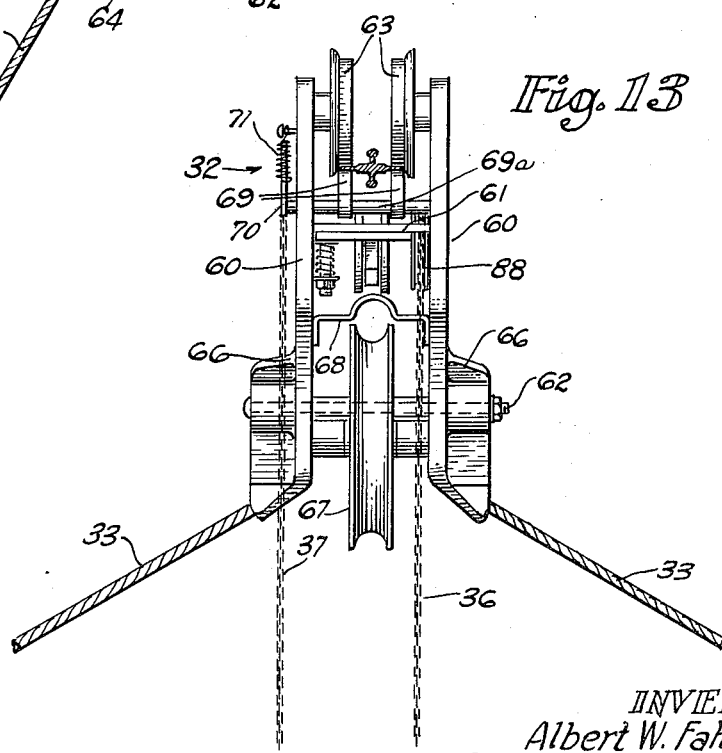

Patented May 13, 1952

2,596,668

UNITED STATES PATENT OFFICE 2,596,668

HAY HANDLING APPARATUS

Albert W. Fahrenkrog, Bunker Hill, Ill.

Application August 25, 1947, Serial No. 770,415

16 Claims. (Cl. 212—76)

This invention relates to hay-handling apparatus for barns or the like.

In the usual arrangement, a single elevated track or trackway is provided on which the hay carrier is mounted to travel and the hay is dropped directly therefrom.

It is an object of this invention to provide a main elevated trackway and one or more branch trackways leading therefrom, and means whereby when the carrier reaches the branch trackway the load-carrying pulley block of the carrier with its load of hay may be transferred from the carrier to the branch trackway and thereafter travel therealong to the point where it is desired to drop the hay.

In the usual arrangement in barns, the elevated track is located in the peak of the roof of the barn and a carrier traveling therealong carries the hay from the unloading place to the mow. This results in dropping the hay along the center line of the mow and requires considerable handwork to distribute the same over the sides and entire surface of the mow. With wide mows the labor required is increased.

A further object of the invention is the provision of this main elevated trackway with branch trackways extending laterally therefrom and means whereby the pulley block of the carrier with its load of hay may be transferred from the carrier on the main track to one of the lateral trackways and travel therealong to drop the hay to or toward the side of the mow.

A further object of the invention is to provide an improved hay-distributing mechanism whereby the carrier may be stopped at any desired predetermined point along the track, and the load-carrying pulley block and the load carried thereby may be unlatched and lowered from the carrier and to engage and glide down a laterally placed sloping branch trackway in the form of a guy or anchor rope or cable on either side of the track whereby to drop the load of hay in any desired position in the mow.

A further object of the invention is to provide a hay carrier and track system having a movable stop and trip device adapted to be moved along the track and to be secured or anchored in any desired position by ropes or cables on either side leading downwardly from the stop and over to the sides of the barn structure at the desired positions, said stop carrying means to engage the load pulley block latch releasing means of the carrier when the latter is propelled along the track into engagement with the stop, said latches of the carrier serving to secure thereto and to sustain the load pulley block and the load carried thereby, and, when unlatched, to permit lowering of the pulley block and load from the carrier on the draft rope of the system, and a selective transfer or glide means attached to the pulley block which is adapted, when properly positioned, to cause the same to engage one or the other of said anchor ropes or cables when the block is so lowered, whereby to guide, slide or glide the pulley block with its load down the anchor cable as a branch trackway to the desired side of the mow and point for dropping the hay.

In the case of heavy fork loads on the carrier, such as may occur in handling green or only partially cured hay or baled hay, the dropping of the same from the height of the elevated track may damage the barn structure, and if the mow is provided with air ducts for drying and curing the hay in the mow, damage to the ducts may result, with consequent impairment of the working of the system and spoiling of the hay. Also, the dropping of green hay from such a height may unduly pack the same in the mow.

A further object of this invention is to provide means whereby the pulley block with its load may be lowered from the track before tripping and dropping the load of hay therefrom, thus decreasing the height of the fall.

Further objects and advantages will appear from the description and claims to follow, in connection with the accompanying drawings which illustrate, by way of example but not of limitation, an embodiment of the invention, and in which—

Fig. 3 is a similar view but with the carrier in engagement with the stop;

Fig. 4 is a cross-sectional view approximately on the line 4—4 of Fig. 3;

Fig 5 is a similar view on the line 5—5 of Fig. 2;

Fig. 6 is a side view on larger scale of the carrier pulley block latch or dog-releasing mechanism located on the stop device on the track and the free end of which enters the hay carrier when the latter engages the stop, in order to be able to release the pulley block from the carrier;

Fig. 7 is a similar view showing the carrier dog-releasing member in the operated position;

Fig. 8 is a plan view of the same parts shown in Figs. 6 and 7 on the line 8—8 of Fig. 6;

Fig. 9 is a cross-section of the same on line 9—9 of Fig. 6;

Fig. 10 is a cross section on line 10—10 of Fig. 6;

Fig. 11 is a plan view of the stop device looking in the direction of the line 11—11 of Fig. 2;

Fig. 12 is a bottom view on the line 12—12 of Fig. 2;

Fig. 13 is an end view of the stop device taken in the direction of the line 14—14 of Fig. 2; and Fig. 14 is a detail view of the lower end of the pulley block with a side of the frame thereof removed.

Figure 1:
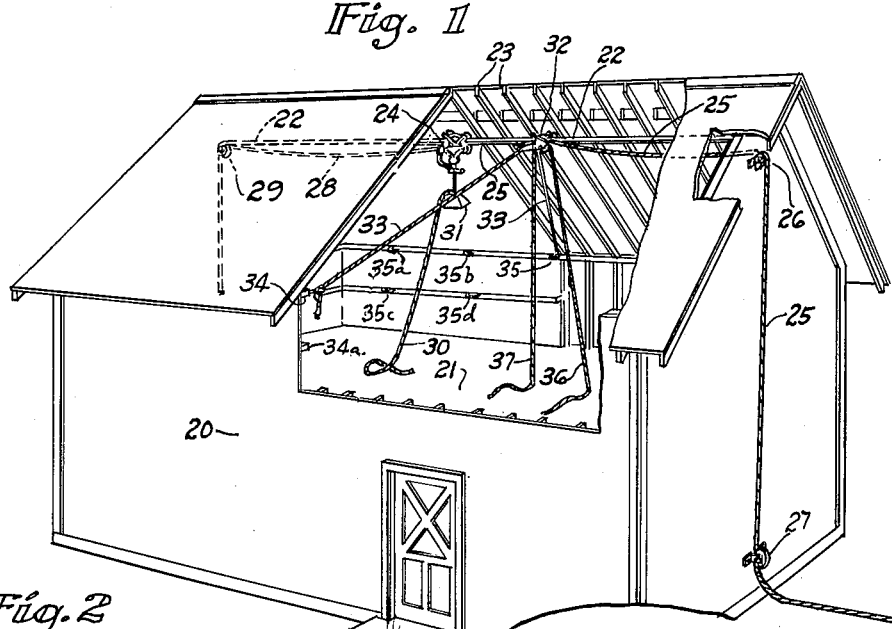
Fig. 1 is a diagrammatic illustration of a barn hay loft or mow with the invention installed.

Referring to these drawings, Fig. 1 shows in perspective the outlines of a barn 20 with portions of the roof and front wall broken away to show the hay-carrying and distributing system installed thereon. The floor of the hay mow is indicated at 21, but in some barns the bottom of the mow extends down in whole or in part of its area to the ground floor of the barn.

The hay carrier system includes the usual elevated steel track 22 which is suspended from and supported by suitable hangers (not shown) from the rafters 23 or their crossbars in the peak of the roof and extends over the center of the mow from end to end of the barn. A suitable hay carrier 24, in the usual installation, traveling on this track carries its load from the receiving end or position to any desired point along the track where it may be dropped in the mow. The receiving end in this instance is at the left end of the barn and is not shown, but may consist, as is common, of a hay door in the gable end of the barn beneath the projecting end of the track. The wagon or truck load of hay may be brought along the outside of said end of the barn, the fork pulley block and fork of the carrier is lowered to the hay load, the fork inserted in the hay, and the pulley block with its fork and load of hay is hoisted from the wagon or truck to the carrier and then carried through said door and over the mow by the carrier.

This hoisting of the carrier's pulley block and the travel of the loaded carrier along the track, as will be later explained more in detail, is accomplished by the pull or draft rope 25, the end of which is attached to the carrier 24, a U-loop or bight of the same passing under the pulley of the fork or load pulley block of the carrier and thence over the pulley 26 in the right gable end of the barn and down under pulley 27. Power of some sort, not shown, is applied to the end of this draft rope 25 to do this hoisting and traveling. It may be a horse or team, a tractor or the like, or a power-driven hoist provided with one or more drums for winding and unwinding of this and other ropes and with suitable controls therefor whereby the desired movements may be imparted to the carrier and apparatus.

A return rope 28 tied at one end to the carrier is preferably employed to return the carrier to the starting position after its load has been discharged in the mow. This rope may be carried down over a pulley 29 at the end of the barn, be manually operated, or provided with a suitable counterweight, or may be connected to a drum provided therefor on the hoist, if one be used. The team or tractor by a suitable system of ropes may be used on their return trip to pull back the carrier to loading position.

The pulley block, fork pulley block or fork pulley, as it is variously called, of the carrier has suspended from it the hay fork or load-gripping device or devices to carry the hay or material from the wagon or truck to the mow, and each such fork or device, whatever its nature, has its own tripping or unlatching device so as to release the load therefrom, and this trip is manually operated by a trip cord 30 which in this instance, and as usual in the larger barns and mows, is operated by a man in the mow.

The fork load of hay, whether of loose dried hay, green hay, so called, baled hay, or the like, is here diagrammatically represented by the relatively small weight 31 for the sake of clearness and to prevent obscuring other parts in the drawings, but it will be understood that in fact the fork load would be a relatively large, bulky mass. Even baled hay is handled in fork loads of ten bales each. Such a fork and its trip rope or cord is disclosed in Letters Patent No. 2,103,370, dated December 28, 1937, to Johnson, to which reference may be had for a full disclosure. However, any desired type of fork or load carrying means and its trip cord, of which many are well known, may be used, and are intended, with the load of hay or similar material carried by the fork, to be indicated and represented herein by the diagrammatic weight block 31 and the trip cord 30 shown.

With such an installation, however, the fork loads of hay are dropped along the line of the track in the center of the mow and must be spread by hand over the sides of the mow. This involves much hard labor and usually under oppressive conditions of heat and a hay-dust-laden atmosphere. With wide mows of the larger barns, the difficulty is increased.

To overcome these and other objections and provide means for causing the apparatus controllably to distribute or drop the hay loads over the sides of the mow as well as over the center, a movable stop and trip device or distributing stop 32, Fig. 1, is placed on the track 22 in advance of the carrier and which may be set at any predetermined place on the track. Cables 33 on each side of the track are permanently attached to the stop device 32 and have loops or ends that may be attached to permanent hooks on the respective barn structure sides parallel to the track, as at 34 and 35. When the carrier 24 is pulled along the track by the draft rope 25, it encounters and is stopped by the stop 32 and, as hereinafter explained, a tripping device on the stop so relates itself to the fork pulley latching mechanism of the carrier that a pull on the cord, chain or rope 36 leading down to the mow unlatches or frees the pulley block from the carrier and lets it descend in its bight or loop of the draft rope 25, the latter being slackened at the time. Selective transfer or gliding devices on the block which have been previously set engage and hook over one or the other of the cables 33, as desired, and permit the pulley block, fork and hay load to slide down the cable toward the corresponding side of the mow, the draft rope 25 slackened for the purpose. When the fork load reaches the desired point over the side of the mow, the trip cord 30 of the fork or load-carrying device is pulled to drop the fork load at the desired point.

Thus, the block, fork and load may be switched from the main track 22 to the side branch track or cable 33 and carried laterally thereon over to the desired point of dropping.

The stop device 32, as will be explained, is provided with a cam lock, or the equivalent, to prevent its return toward the carrier on the track, but permitting it to move in the opposite direction, with the result that when the carrier engages the stop as it is being propelled along the track, the stop will be pushed along until the cables 33 are tightened, and it is then held by the cam lock, with the cables in taut condition. When it is desired to release the stop for movement along the track for resetting or otherwise, the lock may be released by a pull on cord 37.

In order that the hay may be distributed along the sides of the mow from end to end thereof, the cables 33 may be attached at various points along the sides of the mow. Thus, various other attaching points, 35a, 35b, 35c and 35d, are indicated on the far wall of the mow and 34a on the near side, these being intended to be merely indicative of the fact that the cables may be attached at various points and in proper relation longitudinally and vertically of the sides of the barn or mow structure to secure the desired results.

The particular hay carrier 24 herein shown is well known and its construction and operation are well understood by those familiar with the art. Other forms of carriers may be employed. In general, they comprise a body with wheels or rollers running on the track and with a load pulley block with its pulley wheel in a bight or U-loop of the draft rope, so that it may be lowered from the body and hoisted thereto by the rope, and with a grappling or catch mechanism in the body to detachably hold the pulley block in the body when it is raised into engagement therewith. In order to lower the pulley or fork block, this grappling mechanism must be released or unlatched.

Accordingly, the stop or tripping device 32 is equipped with means to engage and unlatch the mechanism of the load pulley block of the carrier upon the stopping engagement of the carrier with the stop to place the same in condition to be unlatched by a pull on a rope, such as the rope 36, when such stopping and registering engagement has taken place. Since the load pulley locking mechanism of different carriers may differ in detail, the unlatched means on the stop may likewise differ in detail. The principle is the same, however, and the disclosed apparatus is fully illustrative thereof.

The carrier 24, as is well known, comprises a frame composed of an upper section 38 and a lower section 39 swivelled together, the upper section carrying the track wheels 40 running on the track 22, and the lower section having a rope wheel 41, a locking dog 42 and grappling hooks or catches 43. The carrier is also provided with a fork or lifting or load pulley block 44, the pulley of which is in a bight or U-loop of the elevating or draft rope 25, the end of which is tied to the carrier frame at 45 and all arranged to operate in the usual manner. The construction and operation of these parts, particularly the dog 42 and hooks 43, are fully disclosed in U. S. Patents No. 620,467, February 28, 1899, and No. 769,175, September 6, 1904, to William Louden.

Suitable safety lugs 46, Figs. 4 and 5, project under the track 22 from the inner faces of the two side members of the upper frame section 38 to prevent displacement of the carrier on the track. The side hooks or catches 43 are suitably pivoted in the side members of the carrier frame, as indicated, and the locking dog 42 is also suitably pivoted in the frame, as at 47, with its upper broad end resting on the arc-shaped tops or upper ends of the hooks 43. The hooks 43 have inwardly extending arms 48 with their ends laterally overlapped. These arms extend across the space for the pulley block 44 when it is out or lowered from the carrier. Upon the entrance of the pulley block into the carrier frame, as when elevated and drawn thereinto by the draft rope 25, it strikes these arms 48 and rotates the hooks 43, so that their lower ends grip the sides of the pulley frame and sustain it in the carrier and its load independently of the draft rope. When the lower ends of these hooks or latches thus swing inwardly, their upper ends swung outwardly and the end of dog 42 resting thereon drops by gravity between said upper ends of the hooks 43. This locks the hooks 43 in pulley-sustaining position until the dog 42 is raised from between their upper ends. This is done ordinarily by a suitable stop on the track at the place where the pulley block and fork are to be lowered to the wagon or truck to be unloaded. The dog 42 is thus provided with a suitable upwardly projecting lug 49 for co-operating with the stop on the track and which raises the end of the dog from between the upper ends of the grappling hooks when the carrier encounters the stop. This frees the catches 43, permitting them to swing by gravity to their outward position to release the pulley block, which may then descend in the bight of the draft rope, such as 25.

In the present apparatus, this upwardly extending lug 49 on the dog 42 is made use of to release the dog when the stop device 32 is encountered, as will be explained, to permit the pulley block and its load to descent from the carrier and glide down one of the side cables or branch tracks 33, as before mentioned.

To accomplish the latter, the pulley block is equipped with or includes suitable load transfer or gliding means whereby when the block is so released and lowered from the carrier it supportingly and slidably engages the side cable, and the block and load then slide or guide down the cable to the point at which it may be desired to drop the load in the mow. For the purpose of distributing the hay on both sides of the mow, this load transfer mechanism is made selective, so that by properly setting it, the load may be transferred to the cable or side track on one side of the track or the other, as desired. In the neutral or normal position of the transfer mechanism, the load may be dropped in the line of the main track, as usual, or lowered and then dropped.

Figure 2:
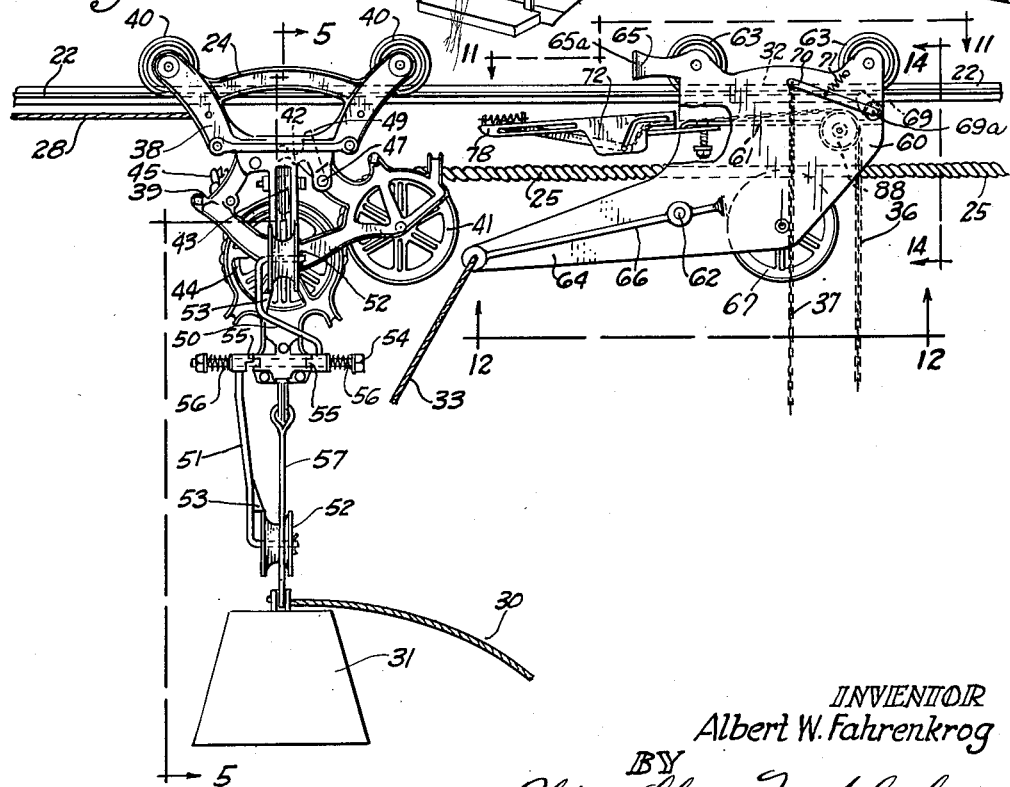
Fig. 2 is a side view of a section of track with the carrier and stop thereon before the carrier quite reaches the stop.

In the present instance, the lower part of the frame of the load pulley block 44 is provided with a pair of pivoted arms 50 and 51, each having at its laterally bent free end a pulley wheel or roller 52 which is relatively thick and widely concaved on the peripheral edge and adapted to engage and slide or glide down the cable track 33 when the carrier engages the distributor stop 32 and the pulley block is lowered from the carrier and the arm 50 or 51 has been set previously in an upright or working position, as indicated in Figs. 2 to 4.

Each arm 50 and 51 is provided with a cam lug 53 which may be welded thereto positively to guide the cable 33 into the pulley 52 when the pulley block is lowered. As seen in Fig. 14, sheet 2, these arms 50 and 51 are journaled or pivoted on the ends of a long bolt 54 which may be slidingly but firmly held in suitably cored-out portions in the meeting faces of the castings forming, when bolted or riveted together, the frame of the pulley block 44. The inner faces of the hubs of arms 50 and 51 and the opposed edges faces of the frame casting are formed to constitute preferably double tooth clutches by the teeth 55 on the hubs of the arm adapted to engage in corresponding notches in the casting when the arm 50 or 51 is raised into its upper operating position, as shown. When the arm or arms are turned down into their inoperative positions, the teeth or lugs 55 are raised out of the depressions or recesses and rest or ride on the unrecessed portion of the opposed face or seat on the casting. A coiled spring 56 is on each end of the bolt and tensioned suitably to press the arm toward the casting.

The result is that when either arm 50 or 51 is turned to its raised position, the clutch teeth engage and hold it there. When it is desired to return the arm to its lowered inoperative position, the arm is pulled outward against the tension of the spring and turned down. If desired, and if the bolt is slidable on the casting, the opposite end of bolt 54 may be pushed or struck to free or assist in freeing the arm at the opposite end. When the arms 50 and 51 are turned down, the pulleys 52 stand on opposite sides of the link 57 connecting the fork pulley with the fork.

The movable distributing stop or carriage 32, Figs. 2, 3, 11, 12, and 13, comprises a strong rigid frame having the two vertical side plates 60 secured together by a spacer plate 61 preferably welded thereto, and by a cross bolt 62 in the lower part, and by other parts later mentioned. Suitable track wheels 63 carried by the side plates at the top are adapted to run on the elevated track 22 and enable the stop to be moved back and forth along the track.

The lower rearward parts 64 of these side plates 60 are extended rearwardly toward the carrier in wing-like extensions which are slightly flared outwardly, as shown in Figs. 11 and 12, and to the ends of which the preferably steel cables 33 forming the branch trackways are secured. The spread of these wings 64 is such that the lower part of the carrier 24 may enter between them, as indicated in Fig. 3. The upper rear corners of the side plates 60 may be extended, as at 65, to form stops or buffers against which the frame of the carrier strikes when the carrier engages the stop. Suitable cushioning pads, as indicated at 65a in Figs. 2 and 3, may be placed on the ends of the projections 65 to receive the impact. A strengthening rib 66 on the outside of each plate 60 and its wing 64 may be provided, and the bolt 62 may pass therethrough. A rope pulley 67 is mounted between the side plates 60 over which the draft rope 25 is carried, a guiding member 68, Fig. 13, between and secured to the sides, serving to keep the rope in place on the wheel.

In use, the stop 32 having been moved to its desired place and the cables 33 anchored at their outer ends, they, the cables, may not be as taut as possible. Consequently, when the carrier is moved into contact with the stop under the influence of the draft rope, it pushes the stop ahead until the cables are taut and it is thereby stopped. Since it is desirable to keep the stop device in this position while the pulley block is on one of the cables, the pull on the draft rope being relaxed, a suitable catch or brake device on the stop is provided, which permits the stop to be pushed along the track by the carrier but prevents its movement in the other direction until released. In this instance, a cam lock is provided comprising the cams 69, see Fig. 13 also, mounted on a cross-shaft 69a between the sides 60 of the stop frame and caused to bear in gripping relation on the under side of the track by a lever 70 on the end of the said shaft and a spring 71, whereby movement of the stop device in the forward direction on the track is permitted but the backward movement thereof is stopped by the cam lock. A rope or cord 37 serves to release this cam lock when it is desired to do so, as when moving the stop to a rearward position. In this way the stop is held on the track with the cables in tensed condition even though the pull on the draft rope is released.

This distributing stop device 32 includes or carries a tripping means to release the load pulley block from the carrier so that the block with its load may be lowered on the draft rope 25 from the carrier when the carrier engages and is stopped by the stop, as above set forth. The specific form of this tripping means depends somewhat on the particular form of carrier employed and its latching means for sustaining the pulley block in the carrier independently of the draft rope, and which must be unlatched or released to permit the pulley block to be lowered from the carrier upon the slackening of the draft rope.

In the present instance, the tripping mechanism projects rearwardly from the stop or toward the carrier and enters the upper part of the carrier between its side members and over the upwardly projecting lug 49 of the dog 42, when the carrier moves forward and engages the stop and in a position to raise the dog 42 from between the grappling hooks 43 when the trip rope 36 is pulled, whereby to release the pulley block from the carrier.

Thus, as seen in detail in Figs. 6 to 10, this elongated tripping member which projects from the stop 32 comprises the two narrow vertical side members 72 which are suitably spaced apart by the material of the free end 73, which may include a welded insert at said end, and by the cross plate 74 at the inner ends of said side members 72, to the upper side of which plate said side pieces are welded at their lower edges. This cross plate 74 is secured, as by welding, to the top face of a larger supporting plate 75 which extends under the spacer plate or shelf 61 of the main frame of the stop. This plate 75 is secured to the plate or shelf 61 by two bolts 76 with countersunk heads in the plate 61 and coiled springs 76a and washers 76b between the underside of plate 75 and the nuts on the said bolts. The edge of the plate 61 has a slightly depending lip 77 against which the plate 75 bears. The holes through plate 75 for the bolts 76 are large enough to permit slight movement of the bolts therein.

By this construction, the tripping extension, while rigidly secured to the stop in the desired position by the bolts and springs, may be capable of a slight vertical movement at its free end due to the springs to enable it to pass over the lug 49 of the dog 42 of the carrier when it engages the stop, the free end of the said extension being upwardly curved or rounded, as at 78, to permit such action.

The slot or longitudinal opening in the extension provided by the spacing of its two side members 72 contains the tripping catch lever 79 in the form of a bar freely fitting within the slot and slidable longitudinally therein. A pin 80 in the catch near its outer end and the cooperating horizontal straight slots 81 in the two side members 72 provide for the longitudinal and tipping movements of the catch 79 at its outer end. A similar pin 82 at the inner end of the catch 79 and the slots 83 in the side members provide for the movement of the catch at its inner end. But at this end of the catch lever the slots 83, instead of being straight throughout, have downward dips or extensions 84 at their outer ends which, when the catch lever is slid outwardly, cause it to tip on the pin 80 as a fulcrum. This is for the purpose of raising the catch lug 85 on the outer end of the catch lever 79 to pass over the lug or shoulder 49 of the locking dog 42 of the carrier when the tripping extension of the stop device enters the carrier, and to depress said lug 85 so as to catch said locking dog shoulder of the carrier to raise the dog to release the pulley block when the catch lever 79 is withdrawn inwardly toward the stop device. Thus, Fig. 6 shows the catch lever 79 in the end position to enter the carrier, and Fig. 7 shows it in the withdrawn position. In the one, the lug 85 does not extend below the lower edges of the sides 72 of the extension and therefore cannot encounter the lug 49 of the carrier-locking dog or other parts of the carrier when the tripping extension of the stop device is inserted therein, and in the other the lug 85 extends below said side members and in position to catch the locking dog lug 49 when it is withdrawn toward the stop.

This tripping catch lever 79 is normally urged and held in its outermost position with the lug 85 sheathed within the slot of the extension by the spring 87 at said end of the extension, as indicated, and is drawn to its opposite position at the desired time by the pull rope or cord 36 attached to the end of the catch lever 79 and passing on through the stop frame and down over the pulley 88 suitably supported therein to the mow below. The upper corner edge of plate 74 as well as that of plate 61 where the rope or cord 36 passes thereover, may be rounded off, as shown in Figs. 6 and 7 at 89 and 90, respectively.

In operation, as will be understood from the foregoing, the carrier 24 bearing its load of hay 31 or the like is drawn forward by the draft rope 25 until it engages the stop 32. This stop 32 is previously adjusted to the desired position along the track 22. This may be done by manipulation of the cam lock rope 37 and the side cables 33, the latter then being attached respectively to the hooks, such as 34 and 35, on the opposite side walls of the barn or mow structure, which are substantially at right angles to the track at the desired position of the stop. The cables thus slope downwardly from the stop to the points of attachment to the sides of the structure.

As the carrier approaches the stop, the tripper extension carried by the stop enters the carrier over the lug 49 of the releasing dog of the carrier until the frame of the carrier engages the projecting stops 65 on the stop frame. The upwardly curved end 78 of this tripper extension enables it to ride over the lug 49 or other parts of the carrier, should they be encountered, the springs on bolts 76 at the base of the extension permitting the said end of the extension to raise and lower slightly during such entrance into the carrier.

At this time, the pull still being exerted on the draft rope 25, the stop is pushed ahead by the carrier until the slack in cables 33 is taken up, the carrier being stopped more or less gradually by the tensioning of the cables. The cam lock 69 on the stop prevents return of the stop when the tension on the draft rope is relaxed and the anchor cables 33 remain taut, the better to serve as slides or trackways for the pulley block above one of them and its load, and to serve as guy ropes for the track, stop and carrier against lateral stresses.

When the carrier is thus stopped and the tripping extension of the stop stands over the locking dog 42 of the carrier, the trip rope 36 may be pulled. This tips down the catch 85 on the slidable lever 79, which catches and draws the lug 49 of the carrier locking dog 42 to the right, raises the same from between the catches or grappling hooks 43, Figs. 1 to 5, and thus releases the load pulley block 44 from the carrier. Since there is more or less tension on the draft rope 25 at this time, the pulley block 44 is being lifted up snugly into the carrier, thus largely taking the weight off the grappling hooks 43 and they readily swing outwardly and free the pulley block 44 to permit it to descend upon relaxation of the rope 25. The trip rope 36 is, of course, released after the pulley block moves down, and the spring 87 on the end of the tripping extension draws the sliding catch lever 79 back toward the outer end of the extension, with its catch 85 within the limits thereof and out of the way of lug 49 of the release dog 42 of the carrier, whereby when the pulley block 49 is returned to the carrier by the draft rope after discharging its load, the grappling hooks operate to catch the pulley block and the dog 42 can fall between their upper ends to lock them and the pulley block in place in the carrier, ready to be drawn back to the starting point for another load.

The load pulley block with its load thus lowers from the carrier upon the pull of the trip rope 36 and the release or relaxation and return of the draft rope 25. Before this the selective transfer arms 50 and 51 with their pulleys 52 of the pulley block have been set to cause the lowering of the load on the one side or other of the mow or in the center of the mow. This is done by raising one of the arms 50 or 51 into its upstanding operative position for a corresponding side delivery or leaving them both down in their lowermost inoperative position for center delivery. This may be done readily, as heretofore explained, and preferably by the man on the wagon or truck, by instruction from the man in the mow.

The setting of the arm and its pulley in operative position, for example the arm 50 as shown in the drawings, places its pulley 52 with respect to the upper end of the cable 33 above the cable, as indicated in Figs. 2 and 5, and in position to engage over the said cable when the load pulley descends, as indicated in Figs. 3 and 4. This transfers the pulley block and its load to the cable 33 as a branch trackway, and as the pull rope 25 is further relaxed they glide or slide down the cable 33 and are carried over toward the side of the mow. Since the cables 33 may not always be at the same angle to the track when viewed in plan, as in Figs. 11 and 12, and may be more nearly perpendicular thereto, the pulleys 52 are made with relatively wide peripheral edges which are suitably concaved to engage the cables whatever their angle when the pulley block is lowered from the carrier. As the load pulley descends further and the bight in the draft rope for the pulley of the block becomes longer, the pulley and load may twist, swing or turn axially slightly so that the pulley 52 assumes a position with its plane more in line with the cable.

When the pulley block with its load reaches the desired point, whether to the far side of the mow or to an intermediate point, the load may be dropped into the mow by pulling the trip rope 30 with which the fork or similar device is always equipped. No particular type of fork or similar device is intended to be shown herein, but all are equipped with a trip cord, such as 30, by which the load may be released from the fork or similar device.

When the load on the fork is dropped, the pulley block and empty fork may be drawn back to the carrier by the draft rope 25. When it reaches the carrier, the block is guided by the draft rope into the flaring mouth of the carrier, and the pulley 52 is lifted above and freed from the cable 33. The catches or hooks in the carrier engage the pulley block, the locking dog 42 drops into position to hold the catches closed, and the carrier may be drawn back to the starting point by the rope 28, or otherwise.

By this means the hay may be distributed over the entire surface of the mow as desired, with much less handwork required than if dropped solely along or below a single track.

A further advantage is that the load may be lowered below the track before it is dropped from the fork, so that it does not fall from such a height as that of the elevated track in the peak of the roof.

Various changes and alterations may be made without departing from the principal or scope of the invention as set forth in the appended claims.

I claim:

1. Hay handling apparatus comprising a main elevated trackway and a branch trackway leading therefrom, a hay carrier mounted to travel on said main trackway, a load-carrying pulley block supported by said carrier for raising and lowering movement, releasable means for securing said pulley block to said carrier in raised position, glide means carried by said pulley block for engaging said branch trackway and travelling therealong when the carrier is moved along said main trackway to bring the glide means into registration with the branch trackway and the securing means is released, and means to effect such release.

2. Hay handling apparatus comprising a main elevated trackway and a branch trackway leading therefrom, a hay carrier mounted to travel on said main trackway, a load-carrying pulley block supported by said carrier for raising and lowering movement, releasable means for securing said pulley block to said carrier in raised position, and glide means carried by said pulley block for engaging said branch trackway and travelling therealong when the carrier is moved along said main trackway to bring the glide means into registration with the branch trackway and the securing means is released, means to effect such release, said glide means being adjustably mounted on said pulley block to move from a position in which movement of the carrier will bring the glide means into registration with the branch trackway to a position in which the glide means will not be brought into registration with the branch trackway.

3. Hay handling apparatus comprising a main elevated trackway, a distributor stop mounted to travel on said main trackway, a branch trackway secured to and extending from said distributor stop, a hay carrier mounted to travel on said main trackway, a load-carrying pulley block supported by said carrier for raising and lowering movement, releasable means for securing said pulley block to said carrier in raised position, glide means carried by said pulley block for engaging said branch trackway and travelling therealong when the carrier is moved along said main trackway to bring the glide means into registration with the branch trackway and the securing means is released, and means to effect such release.

4. Hay handling apparatus comprising a main elevated trackway, a distributor stop mounted to travel on said main trackway, a branch trackway secured to and extending from said distributor stop, a hay carrier mounted to travel on said main trackway, a load-carrying pulley block supported by said carrier for raising and lowering movement, releasable means for securing said pulley block to said carrier in raised position, glide means carried by said pulley block for engaging said branch trackway and travelling therealong when the carrier is moved along said main trackway to bring the glide means into registration with the branch trackway and the securing means are released, and releasing means mounted on said distributor stop for releasing said securing means when the carrier is brought into engagement therewith by movement of said carrier.

5. Hay handling apparatus comprising a main elevated trackway and a plurality of branch trackways leading therefrom, a hay carrier mounted to travel on said main trackway, a load-carrying pulley block supported by said carrier for raising and lowering movement, releasable means for securing said pulley block to said carrier in raised position, means for releasing said securing means, glide means carried by said pulley block, and means for selectively engaging said glide means with said branch trackways and travelling therealong when the carrier is moved along said main trackway to bring the glide means into registration with the branch trackways and the said securing means is released.

6. Hay handling apparatus comprising a main elevated trackway and a plurality of branch trackways leading therefrom, a hay carrier mounted to travel on said main trackway, a load-carrying pulley block supported by said carrier for raising and lowering movement, releasable means for securing said pulley block to said carrier in raised position and means for releasing it, and glide means carried by said pulley block for selectively engaging said branch trackways and travelling therealong when the carrier is moved along said main trackway to bring the glide means into registration with the branch trackways and the securing means is released, said glide means being adjustably mounted on said pulley block to move from a position in which movement of the carrier will bring the glide means into registration with one of the branch trackways to a position in which the glide means will be brought into registration with another branch trackway.

7. In apparatus of the class described, an elevated track, a carrier on the track, a propelling rope for the carrier and a separable load pulley block of the carrier in a bight of the said propelling rope, an adjustable stop on the track for the carrier, a downwardly sloping cable extending laterally of the track and secured at its upper end to the stop, and a transfer member on the said block to supportingly and slidably engage the cable when the carrier reaches the stop and the block is lowered from the carrier, whereby the block and load slide down the cable and the load may be dropped laterally of the track.

8. Material-distributing apparatus for mows or the like comprising a track, a travelling carrier on the track, a propelling rope for the carrier, said carrier having a load-hoisting pulley block suspended in a bight of the carrier propelling rope, a downwardly sloping cable supported at its upper end by and extending laterally from the track, anchor means for securing the other end of the cable, and a member on the pulley block to supportingly and slidably engage said cable near the track when the carrier reaches the same and the block is lowered from the carrier, the block and its load then sliding down the said cable laterally from the track as the block is lowered whereby the load may be dropped in such lateral position.

9. Hay-distributing apparatus for mows comprising an elevated track over the mow, a hay travelling carrier thereon, a propelling rope for the carrier, said carrier having a load-hoisting pulley block suspended in a bight of the propelling rope of the carrier, a pair of descending cables one on either side of the track secured to and extending laterally from the track, anchor means for the lower end of said cable, and selective cable-engaging means on the said pulley block adapted to be preset to engage one or the other of said cables when the carrier is brought adjacent the cables and the block is lowered therefrom, the block sliding down the selected cable and carrying the load therewith to the desired side for dropping in the mow.

10. In apparatus of the class described, an elevated track, a carrier on the track, a propelling rope for the carrier, said carrier having a separable load pulley block suspended in a bight of the propelling rope of the carrier, an adjustable stop on the track for the carrier, a pair of descending cables one on either side of the track extending laterally from the track and secured at their upper ends to the stop and anchored at their lower ends, load transfer members on the block selectively movable from inoperative to operative positions and supportingly and slidably engageable with the corresponding anchored cable when preset in operative position and the block is lowered, and trip means operable on engagement of the carrier with the stop to release the block to be lowered from the carrier, whereby the load may be lowered and dropped along the line of the track or laterally on either side, depending upon the setting of said load transfer members.

11. A hay-distributing apparatus for the mows of barns or the like comprising an elevated track, a travelling hay carrier on the track having a fork or load pulley block raised to or lowered from the carrier by the propelling rope of the carrier, and latching mechanism for detachably securing the block to the carrier, a movable distributing stop on the track, downwardly sloping anchor ropes one on either side of the stop extending laterally therefrom and secured at their lower ends at desired points along the corresponding sides of the barn structure, said anchor ropes enabling the stop to be adjustably positioned along the track, the carrier when propelled along the track engaging the said stop and being stopped thereby, fork pulley block unlatching means carried by the stop and brought into operative position with the carrier by the engagement of the stop and carrier whereby the pulley block and load may be unlatched and lowered from the carrier, and selective load transfer means on the pulley block supportingly and slidably engageable with one or the other of said anchor ropes when the pulley block is so lowered whereby the pulley and load may be diverted to one side or the other of the mow by said anchor ropes and the load dropped in the desired position in the mow.

12. A hay-distributing apparatus for the mows of barns or the like comprising an elevated track, a travelling hay carrier on the track having a fork or load pulley block raised to or lowered from the carrier by the propelling rope of the carrier, and latching mechanism for detachably securing the block to the carrier, a movable distributing stop on the track, downwardly sloping anchor ropes one on either side of the stop extending laterally therefrom and secured at their lower ends at desired points along the corresponding sides of the barn structure, said anchor ropes enabling the stop to be adjustably positioned along the track, the carrier when propelled along the track engaging the said stop and pushing it along the track until stopped by the tightening of the anchor ropes, a releasable lock on the stop to lock it to the track against backward movement thereon, fork pulley block unlatching means carried by the stop and brought into operative position with the carrier latching mechanism by the engagement of the stop and carrier whereby the pulley block and load may be unlatched and lowered from the carrier, and selective load transfer means on the pulley block supportingly and slidably engageable with one or the other of said anchor ropes when the pulley block is so lowered whereby the pulley and load may glide down the rope and be diverted to one side or the other of the mow and the load dropped in the desired position in the mow.

13. In hay-handling apparatus involving a track and a carrier with a pulley block, block releasing means on the carrier, a distributing stop for mounting on the track in advance of the carrier, said stop having provision for attaching sloping anchor cables, one on each side thereof, said stop having carrier pulley block tripping means to register with the block releasing means of the carrier when the carrier engages and is stopped by the stop, a cam lock on the stop to engage the track to prevent backward movement thereon of the stop, and means for attaching trip ropes to said lock to unlock the same and to said tripping means to operate the release means of the pulley block of the carrier.

14. In hay-handling apparatus, a carrier, a load pulley block releasably secured to the carrier, a distributing stop adapted to be movably mounted on a track in the path of the carrier thereon to stop the same when engaged thereby, said stop having side member extensions projecting alongside the lower part of the carrier on both sides thereof when the carrier is stopped by the distributing stop, downwardly sloping cables secured to the ends of said extensions and anchored laterally to the surrounding structure, and transfer arms on the sides of the pulley block selectively adjustable into operative and non-operative position and arranged when in operative position and the block is lowered from the carrier to catch over the corresponding cable and to glide down the same as a trackway carrying the block and its load therewith to the side.

15. In apparatus of the class described, an elevated trackway, a carrier mounted to travel on said trackway, a propelling rope therefor, a load pulley block in a bight of said propelling rope and adapted to be raised to or lowered from the carrier by the propelling rope of the carrier, latching mechanism for detachably securing the block to the carrier, a stop device on the track, the carrier engaging said stop device and being stopped thereby when propelled along the trackway, load pulley block unlatching means carried by the stop device and brought into operative position with the carrier by the engagement of the stop device and carrier, means to operate said unlatching means to lower the block and load by paying out the propelling rope, and means to trip and drop the load from the pulley block at any desired height.

16. In apparatus of the class described, an elevated trackway, a carrier mounted to travel on said trackway, a propelling rope therefor, a load pulley block in a bight of said propelling rope and adapted to be raised to or lowered from the carrier by the propelling rope of the carrier, latching mechanism for detachably securing the block to the carrier, a stop device on the track, the carrier engaging said stop device and being stopped thereby when propelled along the trackway, load pulley block unlatching means carried by the stop device and brought into operative position with the carrier by the engagement of the stop device and carrier, manually operated means including a trip rope to operate said unlatching means to lower the block and load by paying out the propelling rope, and means including a trip rope to trip and drop the load from the pulley block at any desired height.

ALBERT W. FAHRENKROG.

REFERENCES CITED

The following references are of record in the file of this patent:

UNITED STATES PATENTS

| Number | Name | Date |
|---|---|---|
| 263,666 | Pratt | Aug. 29, 1882 |
| 524,806 | Moore | Aug. 21, 1894 |
| 554,198 | Porter | Feb. 4, 1896 |
| 1,121,415 | Stansell | Dec. 15, 1914 |
| 1,126,435 | Ferris | Jan. 26, 1915 |
| 1,196,596 | Shenk | Aug. 29, 1916 |
| 1,343,434 | Cook | June 15, 1920 |